United States Patent
Liu et al.

(10) Patent No.: US 8,988,236 B2
(45) Date of Patent: Mar. 24, 2015

(54) SYSTEM AND METHOD FOR FAILURE PREDICTION FOR ROD PUMP ARTIFICIAL LIFT SYSTEMS

(75) Inventors: Yintao Liu, Los Angeles, CA (US); Ke-Thia Yao, San Ramon, CA (US); Shuping Liu, San Ramon, CA (US); Cauligi Srinivasa Raghavendra, San Ramon, CA (US); Lanre Olabinjo, San Ramon, CA (US); Fatma Burcu Seren, San Ramon, CA (US); Sanaz Seddighrad, San Ramon, CA (US); Dinesh Babu Chinnapparaja Gunasekaran, San Ramon, CA (US)

(73) Assignee: University of Southern California, Los Angeles, CA (US)

( * ) Notice: Subject to any disclaimer, the term of this patent is extended or adjusted under 35 U.S.C. 154(b) by 175 days.

(21) Appl. No.: 13/118,067

(22) Filed: May 27, 2011

(65) Prior Publication Data
US 2012/0025997 A1  Feb. 2, 2012

Related U.S. Application Data

(60) Provisional application No. 61/349,121, filed on May 27, 2010.

(51) Int. Cl.
*G08B 21/00* (2006.01)
*E21B 47/00* (2012.01)

(52) U.S. Cl.
CPC .................................. *E21B 47/0008* (2013.01)
USPC ........................................................ 340/679

(58) Field of Classification Search
CPC ........................................................ G07C 3/00
USPC ...................... 340/679; 166/244.1, 245, 254.2
See application file for complete search history.

(56) References Cited

U.S. PATENT DOCUMENTS

| | | | |
|---|---|---|---|
| 3,941,949 A | 3/1976 | Miller et al. | |
| 5,643,212 A | 7/1997 | Coutré et al. | |
| 5,823,262 A * | 10/1998 | Dutton .................... | 166/250.15 |
| 6,119,060 A | 9/2000 | Takayama et al. | |
| 6,343,656 B1 * | 2/2002 | Vazquez et al. ............... | 166/373 |
| 6,393,101 B1 | 5/2002 | Barshefsky et al. | |
| 6,396,904 B1 | 5/2002 | Lilley et al. | |
| 6,408,953 B1 | 6/2002 | Goldman et al. | |
| 6,456,993 B1 * | 9/2002 | Freund ........................... | 706/46 |
| 7,711,486 B2 | 5/2010 | Thigpen et al. | |

(Continued)

OTHER PUBLICATIONS

Sugato Basu, Semi-supervised Clustering by Seeding, Jul. 2002, Proceedings of the 19th International Conference on Machine Learning.*

(Continued)

*Primary Examiner* — Hai Phan
*Assistant Examiner* — Zhen Y Wu
(74) *Attorney, Agent, or Firm* — Pillsbury Winthrop Shaw Pittman, LLP (57) ABSTRACT

A computer-implemented reservoir prediction system, method, and software are provided for failure prediction for artificial lift well systems, such as sucker rod pump systems. The method includes providing well data from a production well. Attributes are extracted from the well data. Data mining is applied to the attributes to determine whether the production well is predicted to fail within a given time period. An alert is output indicative of impending production well failures.

22 Claims, 11 Drawing Sheets

(56) References Cited

U.S. PATENT DOCUMENTS

| | | | |
|---|---|---|---|
| 7,979,240 B2 | 7/2011 | Fielder | |
| 8,201,424 B2 | 6/2012 | Bodden et al. | |
| 2001/0002932 A1* | 6/2001 | Matsuo et al. | 382/118 |
| 2002/0074127 A1* | 6/2002 | Birckhead et al. | 166/372 |
| 2004/0133289 A1 | 7/2004 | Larsson et al. | |
| 2004/0199362 A1* | 10/2004 | Cao et al. | 702/185 |
| 2005/0010311 A1 | 1/2005 | Barbazette et al. | |
| 2005/0161260 A1 | 7/2005 | Koithan et al. | |
| 2005/0172171 A1 | 8/2005 | Kadashevich | |
| 2006/0040711 A1 | 2/2006 | Whistler | |
| 2006/0074825 A1* | 4/2006 | Mirowski | 706/20 |
| 2006/0228225 A1* | 10/2006 | Rogers | 417/63 |
| 2006/0291876 A1 | 12/2006 | Kawai et al. | |
| 2007/0010998 A1* | 1/2007 | Radhakrishnan et al. | 704/211 |
| 2007/0121519 A1 | 5/2007 | Cuni et al. | |
| 2007/0252717 A1 | 11/2007 | Fielder | |
| 2007/0263488 A1* | 11/2007 | Clark | 367/87 |
| 2008/0006089 A1* | 1/2008 | Adnan et al. | 73/587 |
| 2008/0010020 A1* | 1/2008 | Ellender et al. | 702/6 |
| 2008/0100436 A1 | 5/2008 | Banting et al. | |
| 2008/0106424 A1* | 5/2008 | Bouse et al. | 340/635 |
| 2008/0118382 A1* | 5/2008 | Ramsey et al. | 417/557 |
| 2008/0126049 A1 | 5/2008 | Bailey et al. | |
| 2008/0221714 A1 | 9/2008 | Schoettle | |
| 2008/0253626 A1* | 10/2008 | Shuckers et al. | 382/125 |
| 2008/0262736 A1 | 10/2008 | Thigpen et al. | |
| 2008/0285382 A1* | 11/2008 | Valero et al. | 367/34 |
| 2008/0313112 A1* | 12/2008 | Vapnik et al. | 706/12 |
| 2009/0037458 A1* | 2/2009 | Meyer et al. | 707/102 |
| 2009/0063387 A1* | 3/2009 | Beaty et al. | 706/50 |
| 2010/0082143 A1* | 4/2010 | Pantaleano et al. | 700/105 |
| 2010/0111716 A1 | 5/2010 | Gibbs et al. | |
| 2010/0125470 A1 | 5/2010 | Chisholm | |
| 2010/0169446 A1 | 7/2010 | Linden et al. | |
| 2010/0312477 A1* | 12/2010 | Sanstrom et al. | 702/6 |
| 2011/0078516 A1 | 3/2011 | El-Kersh et al. | |
| 2011/0099010 A1* | 4/2011 | Zhang | 704/233 |
| 2011/0106734 A1* | 5/2011 | Boult et al. | 706/12 |
| 2011/0178963 A1 | 7/2011 | Hartman et al. | |
| 2011/0184567 A1* | 7/2011 | Sonnier | 700/282 |
| 2011/0225111 A1* | 9/2011 | Ringer | 706/14 |
| 2011/0246409 A1* | 10/2011 | Mitra | 706/52 |
| 2011/0320168 A1 | 12/2011 | Lake et al. | |
| 2012/0025997 A1 | 2/2012 | Liu et al. | |
| 2012/0109243 A1 | 5/2012 | Hettrick et al. | |
| 2012/0143565 A1 | 6/2012 | Graham, III et al. | |
| 2012/0191633 A1 | 7/2012 | Liu et al. | |
| 2013/0080117 A1 | 3/2013 | Liu et al. | |
| 2013/0151156 A1 | 6/2013 | Noui-Mehidi et al. | |
| 2013/0173165 A1 | 7/2013 | Balogun et al. | |
| 2013/0173505 A1 | 7/2013 | Balogun et al. | |
| 2013/0212443 A1 | 8/2013 | Ikegami, T. | |

OTHER PUBLICATIONS

Ruggeri F., Bayesian Networks, 2007, Encyclopedia od Statisitics in Quality & Reliability.*

Bremner, Chad, et al.; "Evolving Technologies: Electrical Submersible Pumps"; Oilfield Review, Winter 2006/2007, pp. 30-43.

Non-Final Office Action mailed Mar. 17, 2014, during the prosecution of Co-Pending U.S. Appl. No. 13/351,318, filed Jan. 17, 2012.

* cited by examiner

Extract_feature $(T, \tau, [step_1, step_2], D)$

1. For each well $T_i, T_i \in T$
2.    Time $t$ from 1 to $(length\_of\_T_i - \tau + 1)$
3.      For each attribute $a_{ij} \in T_i$
4.          Do robust polynomial regression two sub-subsequences and get their coefficients
5.          $[m_1, \Delta m] = [first\ step_1\_coef, next\ step_2\_coef - first\ step_1\_coef]$
6.          $f_{ij}(t) = \dfrac{[m_1, \Delta m]}{coef\ of\ a_i\ in\ previous\ D\ records}$
7.          $label_{ij}(t) = \begin{cases} failure, if\ failure\ happens\ within\ next\ D\ days \\ normal, if\ no\ failure\ happens\ in\ the\ near\ future \end{cases}$

FIG. 5

| Random peek (T) | |
|---|---|
| 1 | For each well $T_i, T_i \in T$ |
| 2 | Extract features from $T_i$ |
| 3 | Do 2-class clustering algorithm on the feature set |
| 4 | Store the larger cluster's centroid into results |

SYSTEM AND METHOD FOR FAILURE PREDICTION FOR ROD PUMP ARTIFICIAL LIFT SYSTEMS

CROSS-REFERENCE TO A RELATED APPLICATION

The present application for patent claims the benefit of U.S. Provisional Application bearing Ser. No. 61/349,121, filed on May 27, 2010, which is incorporated by reference in its entirety.

TECHNICAL FIELD

This invention relates to well failures in oil field assets, and more particularly, to a system, method, and computer program product for failure prediction for well systems such as rod pump artificial lift systems.

BACKGROUND

Artificial lift techniques are widely used to enhance production for reservoirs with energy levels too low to directly lift fluids to the surface. Among various artificial lift techniques in the industry (such as Gas Lift, Hydraulic Pumping Units, Electric Submersible Pump, Progressive Cavity Pump and Rod Pump techniques), the Sucker Rod Pump technique is the most commonly used. For example, approximately 95% of world pumping units utilize Sucker Rod Pumps.

Rod pump failures can be broadly classified into two main categories: mechanical and chemical. Mechanical failures are typically caused by improper design, by improper manufacturing, or by wear and tear during operations. Well conditions may contribute to excessive wear and tear, such as sand intrusions, gas pounding, and asphalting. Chemical failures are generally caused by the corrosive nature of the fluid being pumped through the systems. For example, the fluid may contain H2S or bacteria. For rod pumps these mechanical and chemical causes manifest themselves as tubing failures, rod string failures and rod pump failures. These failures initially reduce the efficiency of the pumping operation, but in due course will bring the systems to fail and require reactive well work. These workovers shut down the systems causing production loss and increasing the operational expenditure (OPEX) in addition to the regular maintenance cost.

Currently pump off controllers (POCs) play a major role in monitoring the operation of well systems. POCs can be programmed to automatically shut down units if the values of torque and load deviate beyond cutoff boundaries. Also, by analyzing the dynocard patterns collected by the POCs one can understand the behavior of these units. These POCs reduce the amount of work required by the production and maintenance personnel operating the field. However, the POCs by themselves are not sufficient as a great deal of time and effort is still needed to monitor each and every unit operating. Accordingly, there is a need for more automated systems, such as artificial intelligent systems that can dynamically keeps track of certain parameters in each and every unit, give early indications or warnings for failures, and provide suggestions on types of maintenance work required based on the knowledge acquired from previous best practices. Such systems would be a great asset to industry personnel by allowing them to be more proactive and to make a better maintenance decision. These systems would increase the efficiency of the pumping units to bring down OPEX, thereby making the pumping operations more economical.

SUMMARY

A computer-implemented method is disclosed for failure prediction for artificial lift well systems. The method includes providing well data from a production well, such as a production well utilizing a sucker rod pump. Attributes are extracted from the well data. Data mining is applied to the attributes to determine whether the production well is predicted to fail within a given time period. An alert is output indicative of impending production well failures.

In one embodiment, data preparation techniques are applied to the well data.

In one embodiment, extracting attributes from the well data includes generating a multivariate time series. In one embodiment, extracting attributes from the well data includes applying a sliding window approach to extract multiple multivariate subsequences.

In one embodiment, applying data mining to the attributes includes applying an alternating decision tree method. In one embodiment, applying data mining to the attributes includes applying a Bayesian Network method. In one embodiment, applying data mining to the attributes includes applying a support vector machine method. In one embodiment, applying data mining to the attributes includes applying a random peek semi-supervised learning technique.

In one embodiment, operating parameters of the production well are adjusted to forestall a failure responsive to the alert. In one embodiment, maintenance is scheduled for the production well responsive to the alert.

According to aspects of the present invention, a system is disclosed for failure prediction for artificial lift well systems. The system includes a database, a computer processor, and a software program. The database is configured to store data comprising well data from a production well. The computer processor is configured to receive the stored data from the database, and to execute software responsive to the stored data. The software program is executable on the computer processor. The software program includes a Feature Extraction Module and a Failure Prediction Module. The Feature Extraction Module is configured to extract attributes from the well data. The Failure Prediction Module is configured to apply data mining to the attributes to determine whether the production well is predicted to fail within a given time period.

In one embodiment, the system includes a display that communicates with the Failure Prediction Module of the software program such that an alert indicative of impending production well failures is produced on the display.

In one embodiment, the software program includes a Data Extraction Module configured to extract attributes from the well data in the form of a time series.

In one embodiment, wherein the software program further comprises a Data Preparation Module configured to reduce noise in the well data.

In one embodiment, the Feature Extraction Module is further configured to generate a multivariate time series. In one embodiment, the Feature Extraction Module is further configured to apply a sliding window approach to extract multiple multivariate subsequences.

In one embodiment, the Failure Prediction Module is further configured to apply a random peek semi-supervised learning technique.

According to aspects of the present invention, a computer program product is disclosed. The computer program product comprises computer usable medium having a computer readable program code embodied therein. The computer readable program code includes a Feature Extraction Module and a Failure Prediction Module. The Feature Extraction Module is configured to extract attributes from the well data. The Failure Prediction Module is configured to apply data mining to the attributes to determine whether the production well is predicted to fail within a given time period.

In one embodiment, the Failure Prediction Module is further configured to apply a random peek semi-supervised learning technique.

DETAILED DESCRIPTION

Embodiments of the present invention relate to well failures in oil field assets, which lead to production loss and can greatly increase operational expenditures. In particular, systems, methods, and computer program products are disclosed for analyzing and predicting the performance on wells such as on sucker rod pumps. For example, these units are developed using artificial intelligence (AI) and data mining techniques. Predicting well failures can dramatically improve performance, such as by adjusting operating parameters to forestall failures or by scheduling maintenance to reduce unplanned repairs and minimize downtime. As will be described in more detail herein, a failure prediction framework and algorithms for rod pump artificial lift systems are disclosed. State-of-the-art data mining approaches are adapted to learn patterns of dynamical pre-failure and normal well time series records, which are used to make failure predictions. Also, a semi-supervised learning technique, called "random peek", is developed such that the training process covers more feature space and overcomes the bias caused by limited training samples. The results show that the failure prediction framework is capable of capturing future rod pump and tubing failures using data from real-world assets using rod pump artificial lift systems.

Data Collection

To perform failure prediction, data is first collected for production wells of interest, such as sucker rod pumps. For example, data can be collected from pump off controllers (POCs), which gather and record periodic well sensor measurements indicating production and well status through load cells, motor sensors, pressure transducers and relays. Some attributes recorded by these sensors are card area, peak surface load, minimum surface load, strokes per minute, surface stroke length, flow line pressure, pump fillage, yesterday cycles, and daily run time, while calculated GB torque, polished rod HP, and net DH pump efficiency are calculated. These attributes are typically measured daily, sent over wireless network, and recorded in a database such as LOWIS™ (Life of Well Information Software), which is available from Weatherford International Ltd. In the database, attribute values can be indexed by a well identifier and a date. In addition to these daily measurements, field specialists can perform intermittent tests and enter the test results into the database. These attributes include last approved oil, last approved water, and fluid level. Since these attributes are generally not measured daily, the missing daily values can be automatically filled in with the previous measurement, i.e., these attribute values are assumed to be piecewise constants. Finally, a special attribute called "class" can be added that indicates the daily status of the well, i.e. either it is performing normally or it has failed. All these attributes together define a labeled multivariate time series data set for artificial lift.

The attributes can be partitioned into a plurality of attribute groups and ranked according to a metric that combines relevancy to failure predication and data quality. In one embodiment, the attribute groups are divided into three groups, which are labeled A, B and C with group A being the most relevant and having the highest data quality.

A. Card area, peak surface load, minimum surface load, yesterday cycles, daily run time
B. Strokes per minute, pump fillage, calculated GB torque, polished rod HP, net DH pump efficiency, gross fluid rate (sum of last approved oil and water), flow line pressure
C. Surface stroke length In traditional supervised learning, the data mining algorithm is given positive and negative training examples of the concept the algorithm is supposed to learn. The formulation for this artificial lift domain is given an artificial lift multivariate time series with well class labels as the training data set, which can be used to generate a failure prediction model. When given previously unseen wells from a test data set with their multivariate time series, but not the class values, this model predicts class values for that well. This learning problem is called supervised, because the class labels are used to direct the learning behavior of the data mining algorithm. In the traditional supervised learning formulation, the resulting prediction model does not change with respect to well data from the testing set. Embodiments of the present invention utilize semi-supervised learning, where a test set is used to improve the performance of the model. Here, only part of the training data set is labeled.

Figure 1:
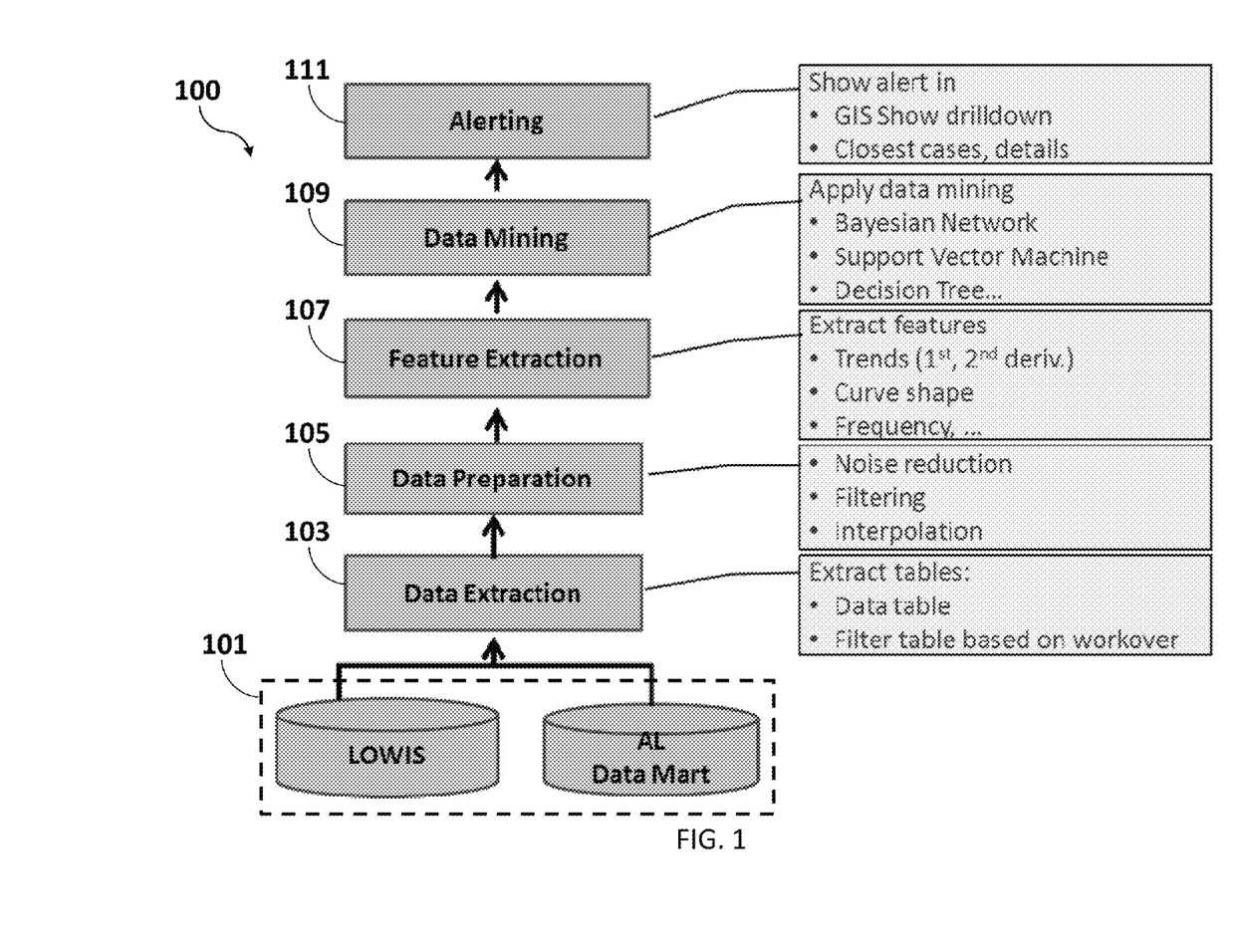
FIG. 1 is a flow diagram showing a method for analyzing and predicting the performance on wells, according to an embodiment of the present invention.

FIG. 1 shows method 100 for failure prediction according to embodiments of the present invention. In step 101, data is stored either in one or more databases, such as LOWIS™ or in Artificial Lift System data marts. In step 103, data (e.g. workovers, beam analysis tables, etc) needed for failure prediction is extracted into tables. Data preparation is performed in step 105 to address the problem of noise and missing values. In step 107, the de-noised data is transformed into features and all the time series data is transformed into a feature set. In step 109, general supervised learning algorithms are applied to train, test and evaluate the results in the data mining stage. In step 111, the system visually depicts alerts to provide warning of impending failures.

Data Extraction

Data gathering is the first step in method 100. In step 101, data extraction provides software connectors capable of extracting data from the artificial lift databases and feeding it to the prediction system. For example, this can be achieved by running a SQL query on the database, such as LOWIS™ or the artificial lift data mart, to extract the necessary attributes for each well in the form of time series.

Data Preparation

Raw artificial lift time series data typically contains noise and faults, which can be attributed to multiple factors. For example, severe weather conditions, such as lighting strikes, can disrupt communication causing data to be dropped. Transcription errors may occur if data is manually entered into the system. This noisy and faulty data can significantly degrade the performance of data mining algorithms. Data preparation reduces the noise as much as possible. An example of a noise reduction technique includes using the Grubbs's test to detect outliers and applying a locally weighted scatter plot smoothing algorithm to smooth the impact of the outliers.

Figure 2A:
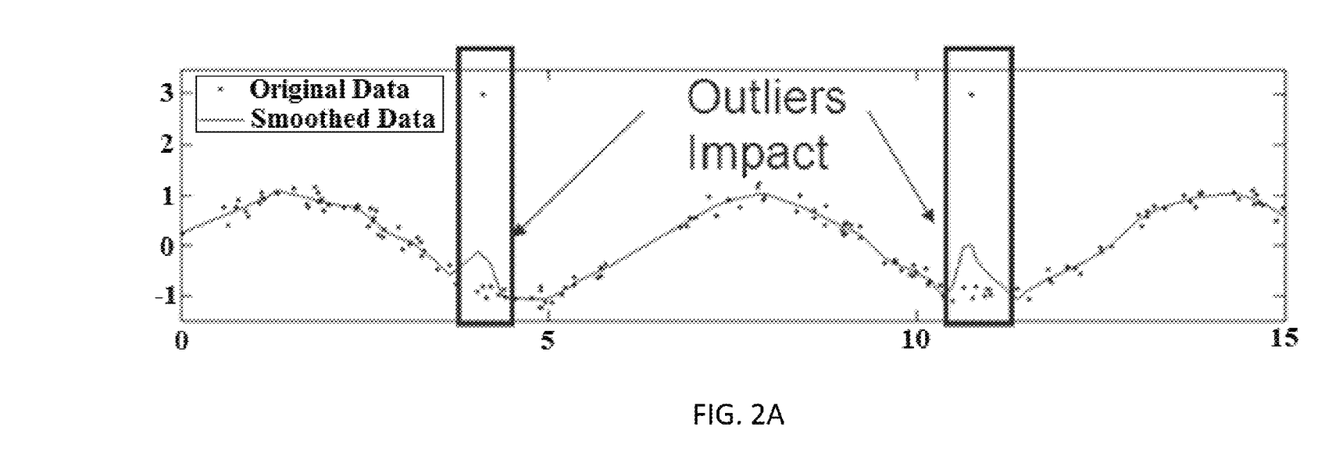
FIGS. 2A and 2B show the results of using data preparation techniques, according to an embodiment of the present invention.
Figure 2B:
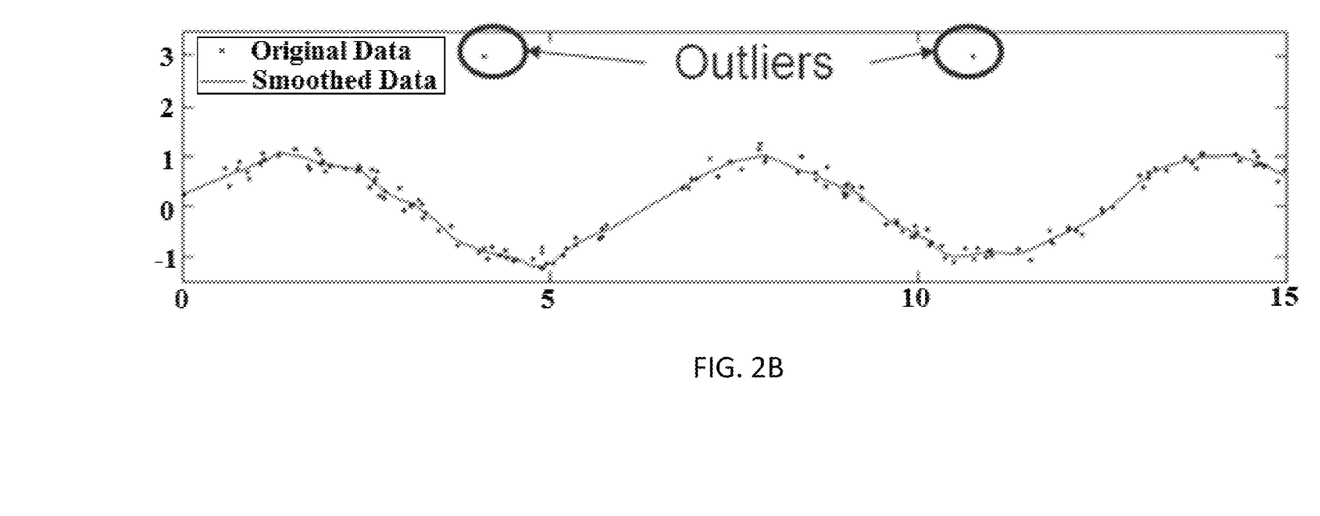

FIG. 2 shows the impact of outliers and the results for before (2A) and after (2B) the smoothing process using linear regression on artificial data points where random Gaussian noise and two outliers were added. The two outliers have biased the curve by introducing two local peaks—which in fact do not exist. After the outliers were removed, the same regression algorithm is able to recover the original shape of the curve.

Feature Extraction

In artificial lift, each well is characterized by multiple attributes, where each attribute by itself is a temporal sequence. This type of data set is called a multivariate time series. For example, methods that can be used for feature extraction include those described by Li Wei and Eamonn Keogh at the 12th ACM SIGKDD international conference on knowledge discovery and data mining (Li Wei, Eamonn J. Keogh: Semi-supervised time series classification. *KDD* 2006: 748-753), which is herein incorporated by reference in its entirety.

The data type of interest, which as used herein is a multivariate time series $T=t_1, t_2, \ldots, t_m$ comprising an ordered set of m variables. Each variable $t_i$ is a k-tuple, where each tuple $t_i=t_{i1}, t_{i2}, t_{i3}, \ldots, t_{ik}$ contains k real-values.

As used herein, the multivariate time series refers to the data for a specific well. Data miners are typically not interested in any of the global properties of a whole multivariate time series. Instead, the focus is on deciding which subsection is abnormal. Therefore, if given a long multivariate time series per well, every well's record is converted into a set of multivariate subsequences. In particular, given a multivariate time series T of length m, a multivariate subsequence $C_p$ is a sampling of length w<m of contiguous position from T, that is, $C_p=t_p, t_{p+1}, \ldots, t_{p+w-1}$ for $1 \leq p \leq m-w+1$.

Figure 3:
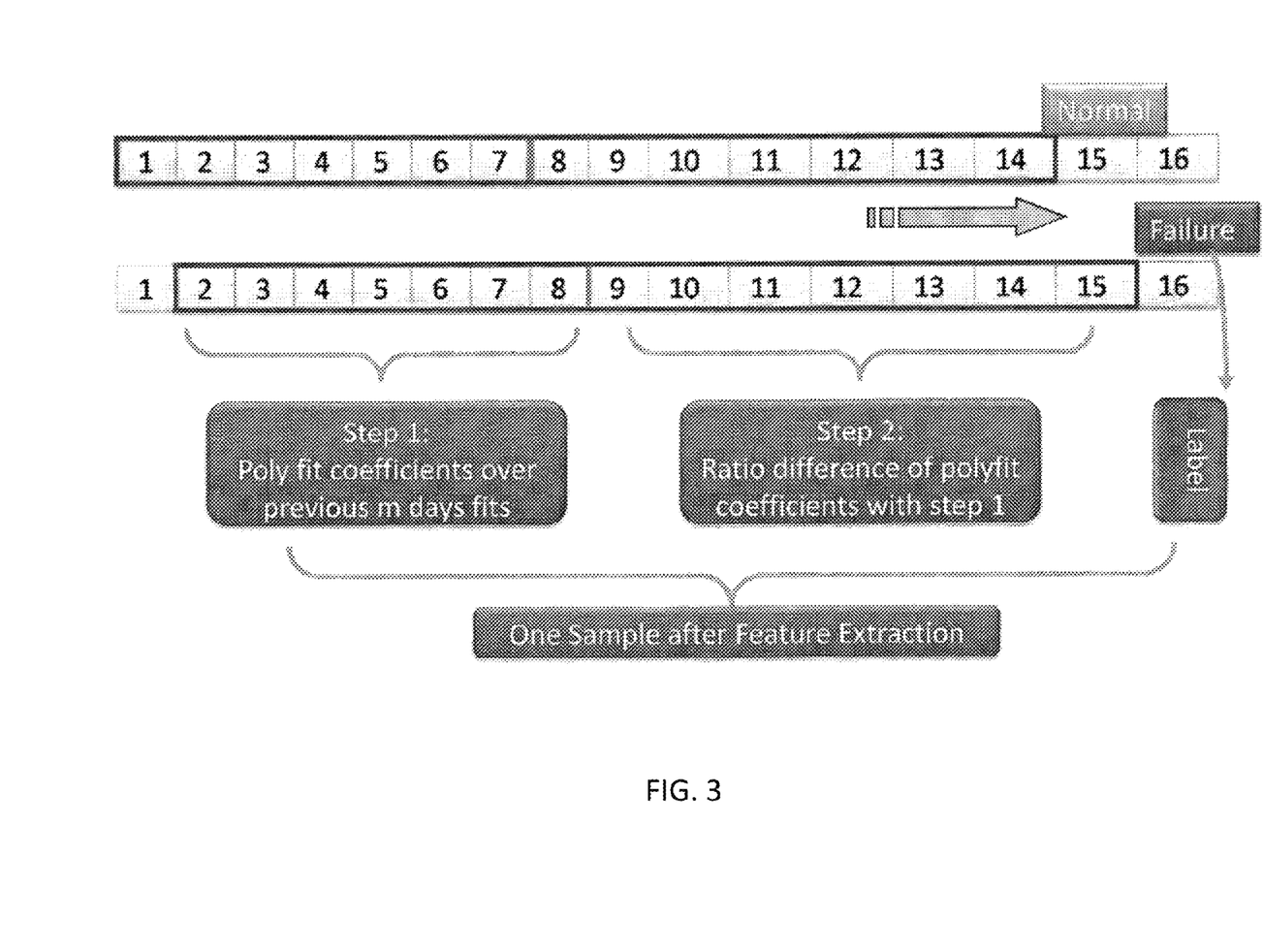
FIG. 3 shows a sliding window approach used for feature extraction, according to an embodiment of the present invention.
Figure 4A:
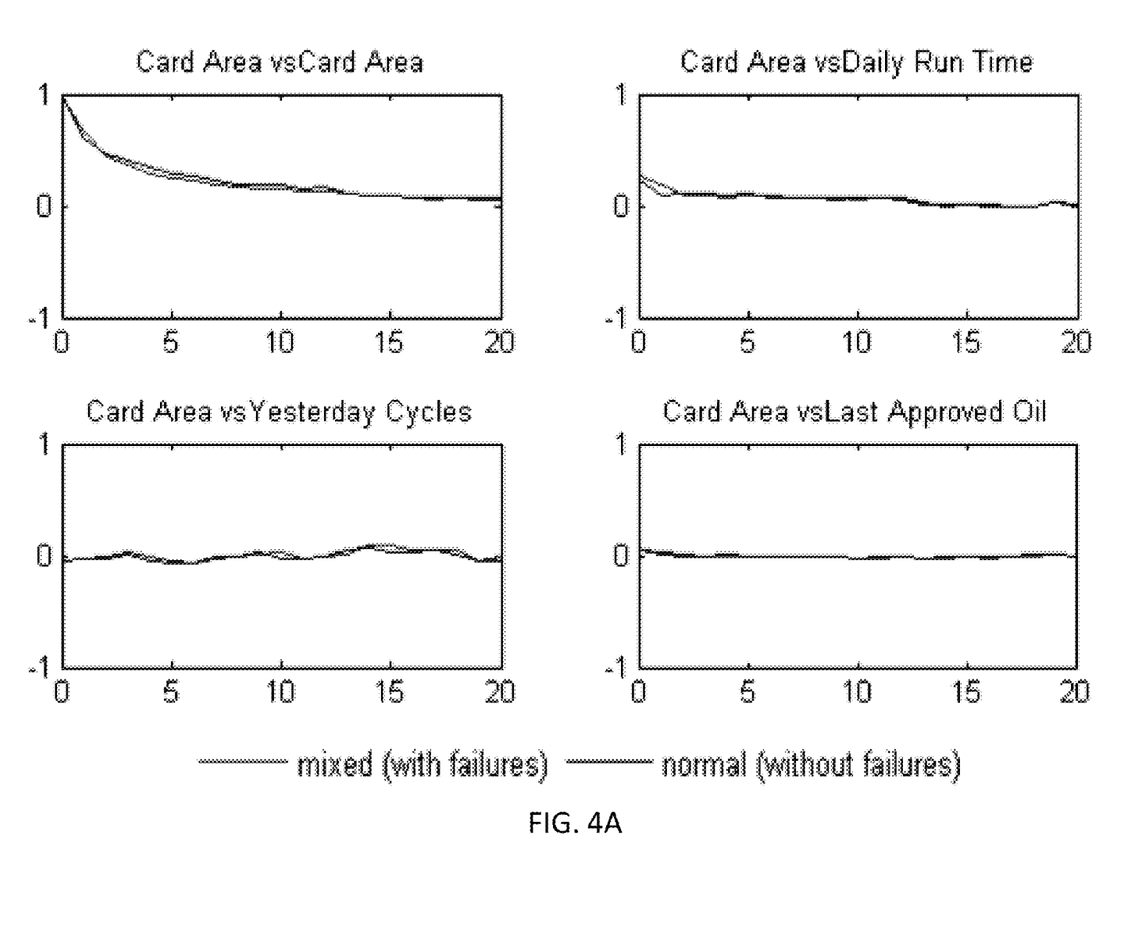
FIGS. 4A-4D show correlation analysis for card area (4A), daily run time (4B), yesterday cycles (4C) and last approved oil (4D) attributes, according to embodiments of the present invention.
Figure 4B:
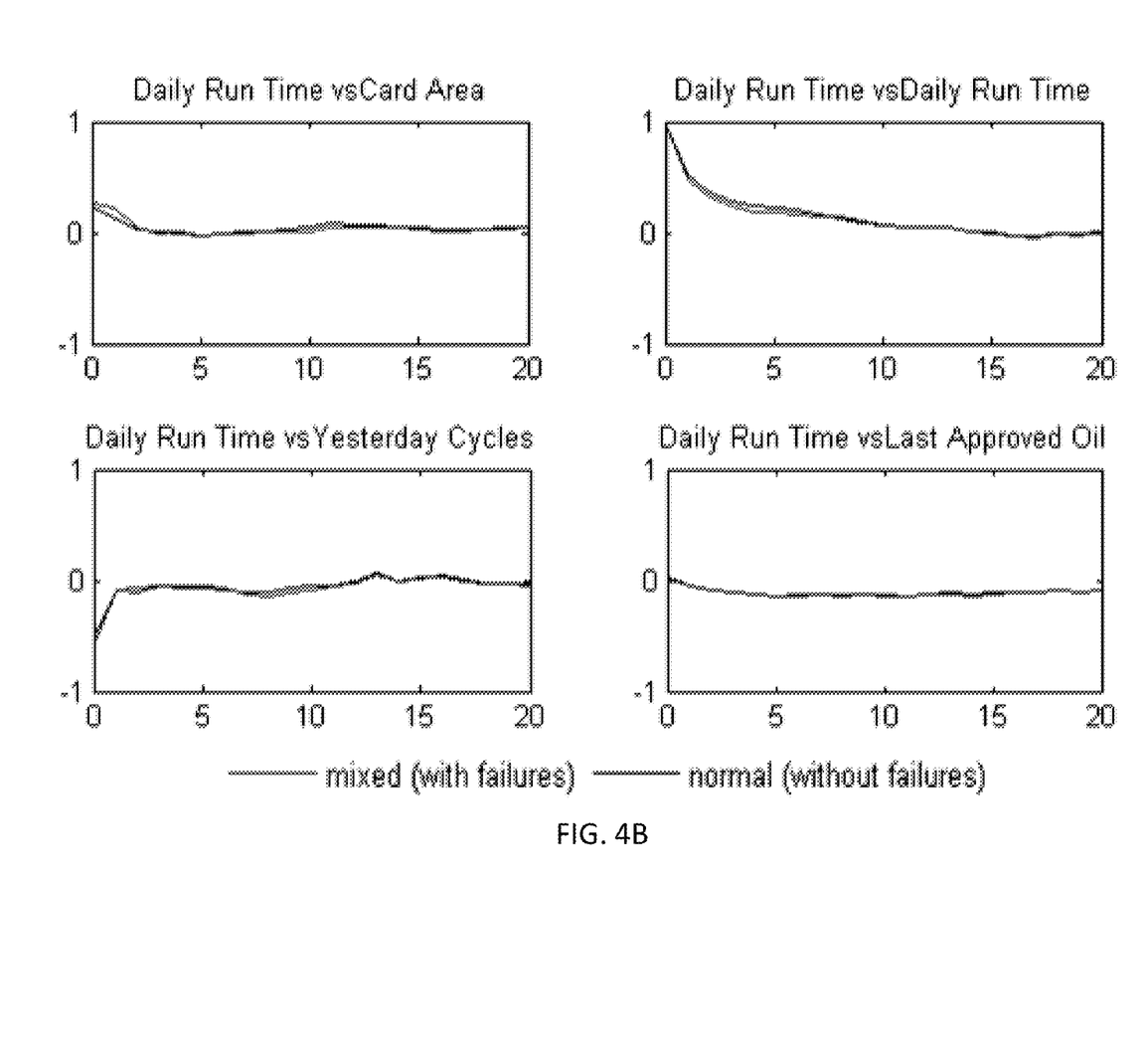
Figure 4C:
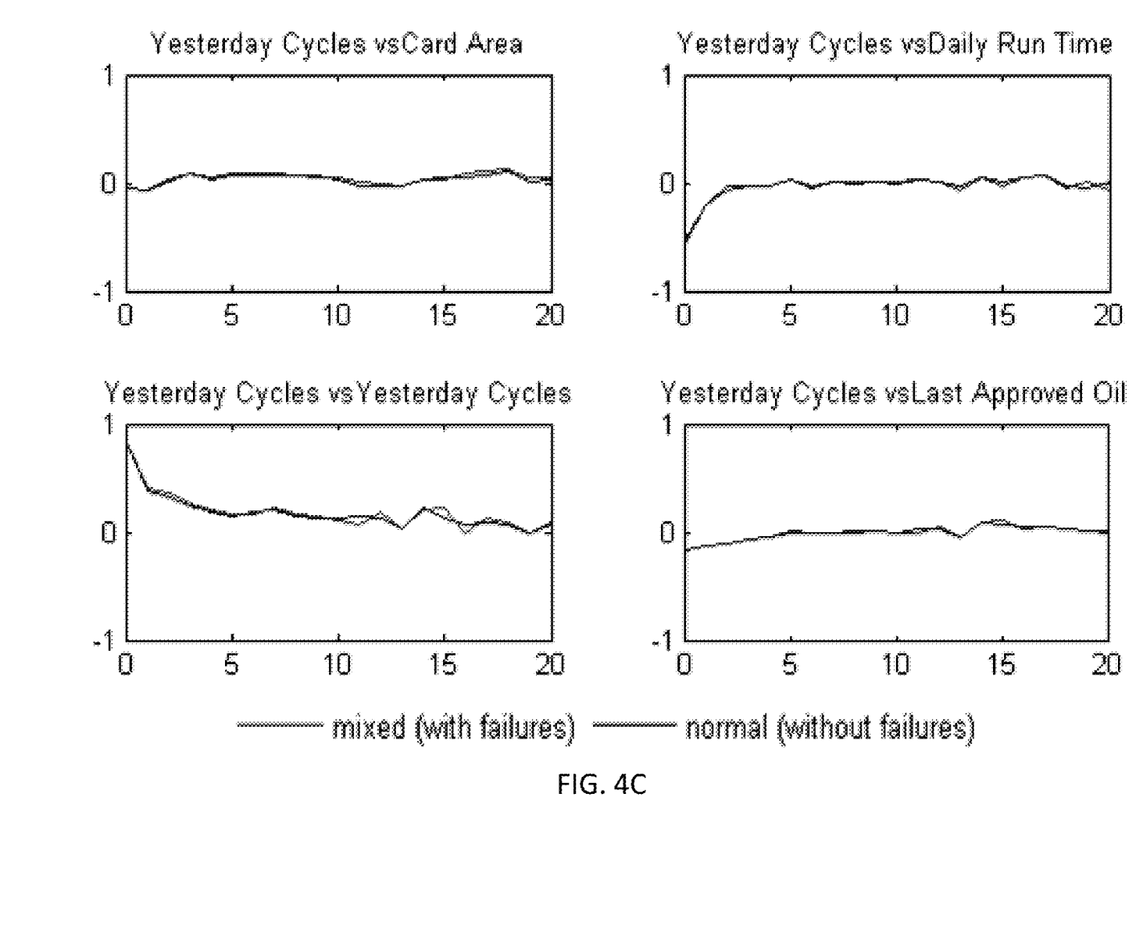
Figure 4D:
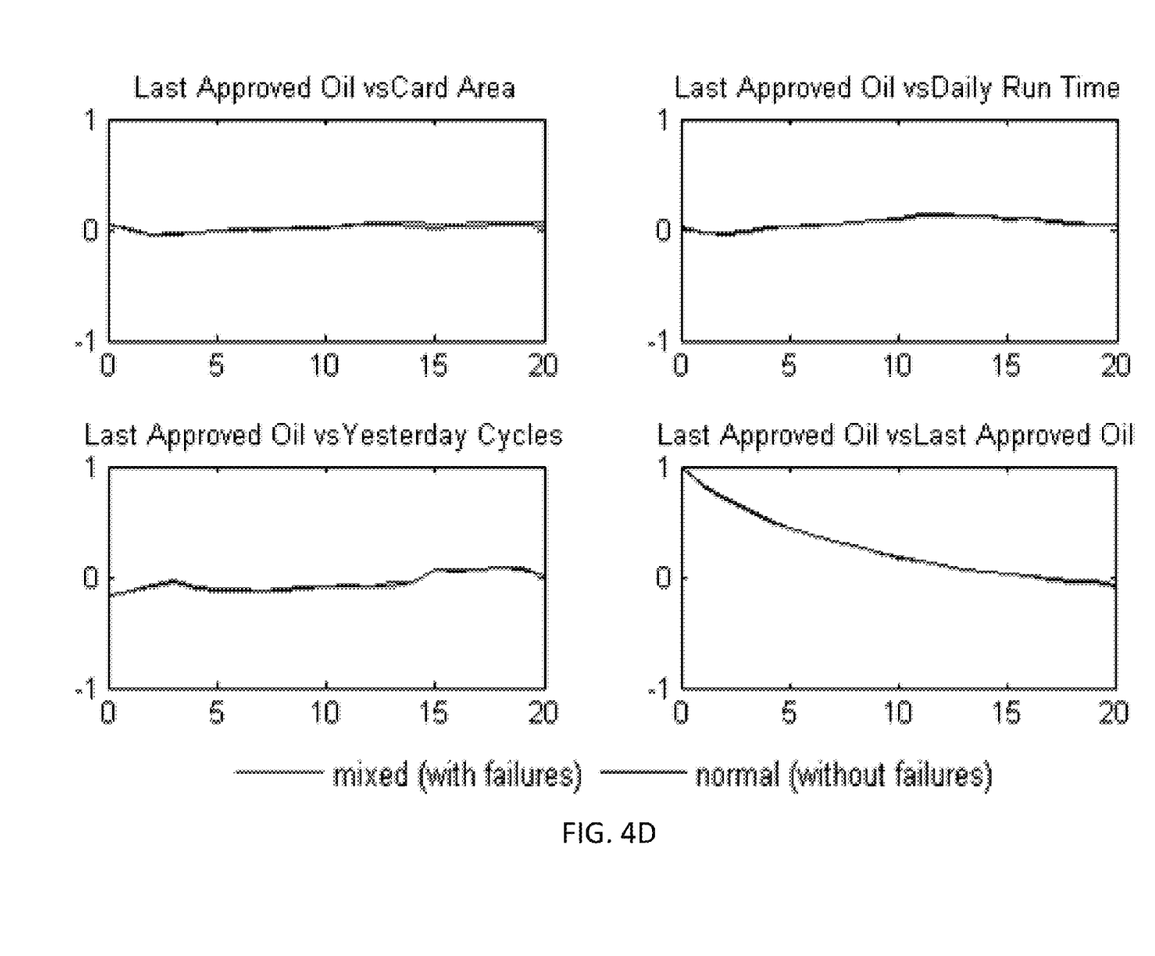

A sliding window approach is used to extract multiple multivariate subsequences. Given a multivariate time series T of length m, and a user-defined multivariate subsequence length of w, sliding window subsequences are all possible subsequences that can be extracted by sliding a window of size w across T and extracting each subsequence. FIG. 3 depicts an example of feature extraction using a sliding window approach.

The subsequence sampling length w is then estimated. If w is too small, the subsequences may fail to capture enough trend information to aid in failure prediction. If w is too large, the subsequences may contain extraneous data that hinders the performance of the data mining algorithms. High dimensional data are well known to be difficult to work with. In addition, high dimensional data may incur large computational penalties. To estimate the correct w, two questions are posed: 1) what is the dependency between attributes across time? and 2) what is the dependency between an attribute's current value with its prior values? To determine the first question, cross-correlation analysis is applied. Given a multivariate time series T of k attributes, the cross-correlation is a measure of similarity of two attributes' sequences as a function of time-lag r applied to one of them. To determine the second question, autocorrelation is applied. Given a single time series T, autocorrelation is the cross-correlation with itself.

FIG. 4 describes the correlation analysis among a subset of four attributes from our dataset: card area (4A), daily run time (4B), yesterday cycles (4C), and last approved oil (4D). The x-axis in FIGS. 4A-4D is the time-lag τ, and the y-axis is the correlation. The subplots along the diagonal are autocorrelations, and the other subplots show the cross-correlations. These plots indicate pairwise attributes rapidly becoming uncorrelated as a function of time lag. Even with a fixed w, these subsequences still have high dimensionality –w×k.

The dimensionality of the subsequences is further reduced by performing feature extraction. Given a multivariate time series subsequence $C_p$ of length w, the feature $f_p$ of $C_p$ is by constructing combinations of the high dimensional w×k space into a 1×n feature vector, where n<w×k, while still preserving its relevant characteristics.

There are many different methods for feature extraction, such as principle component analysis, isomap, locally linear embedding, wavelet, as well as, simple linear combinations such as statistical mean, median, and variance. There are also domain-specific approaches in time series feature extraction, such as event related potential (ERP) in neuroscience and Discrete Fourier Transform (DFT) in signal processing. Three important criterions for good feature sets include:
 1. Reflect the nature of the data, e.g. it is robust, reliable and time invariant
 2. Capture critical relevancy to perform desired task, e.g. it is feasible to detect and predict failures
 3. Reduce dimensionalities Various feature extraction approaches were tested and the feature extraction technique described below provided the best results for failure prediction in the example cases. This feature extraction technique satisfies the three criteria listed above by combining domain knowledge, correlation analysis, robust regression, and normalizations. For example, multivariate time series feature normalization is used, wherein given a correlation time-lag limit τ and feature $f_p$ of a multivariate time series subsequence $C_p$ of length w, the normalized feature $f_p$ of $C_p$ is computed by dividing the median of the former τ features of subsequences.

In the dataset, attributes sometimes suddenly changed their values just before failure events occurred. In order to capture these sudden changes, each subsequence $C_p$ was divided into two sub-subsequences of size $step_1$ and $step_2$. The $step_1$ size is set larger than or equal to $step_2$ so that the first sub-subsequence preserves most of the information, while the second sub-subsequence helps indicate the sudden change by calculating the difference Δm.

Figure 5:
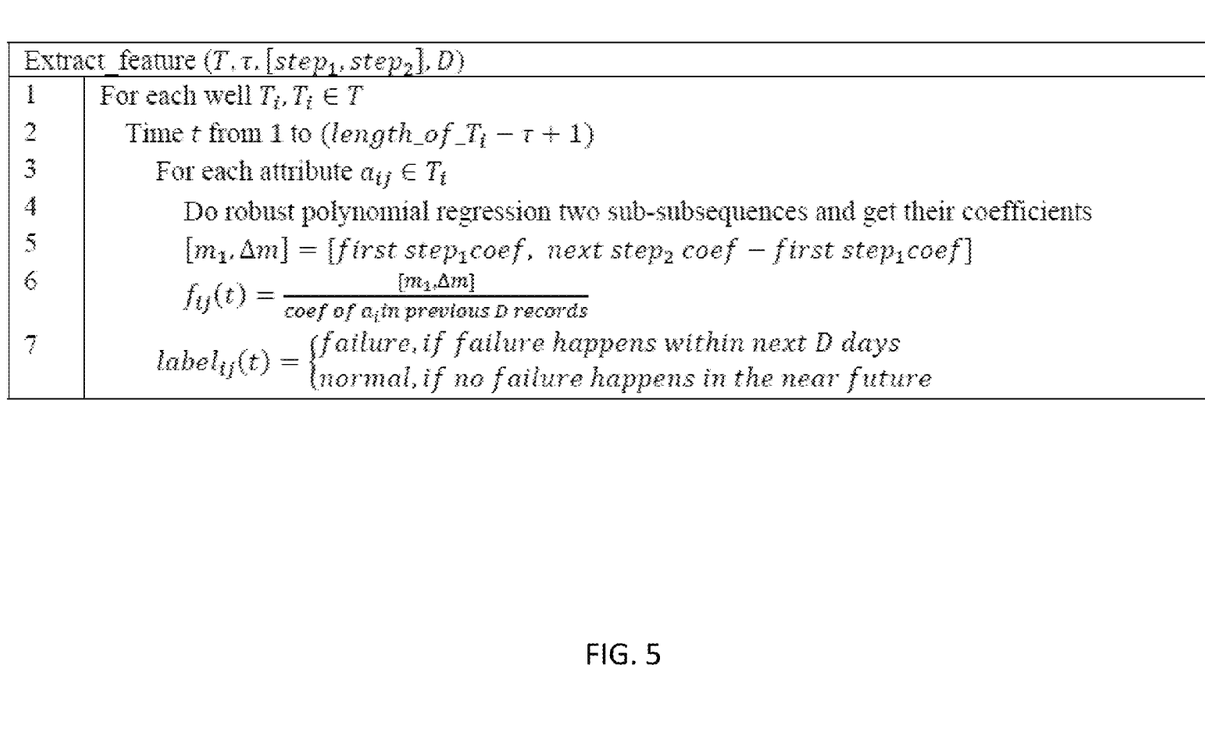
FIG. 5 shows a method for feature extraction, according to an embodiment of the present invention.

FIG. 5 shows an example algorithm for multivariate time series feature extraction. In this algorithm, the multivariate time series T, time-lag limit τ, sub-subsequences of size $step_1$ and $step_2$, and the maximum delay by domain engineers are extracted, which is the introduced in step 109 for failure prediction.

Failure Prediction

General data mining classification algorithms are used to predict failures and evaluate results by using real datasets from actual fields. In the training and testing process, τ=14 days is used as the subsequence length, D=1 as the polynomial coefficients, and [7, 7] days for the step sizes. For each well failure, one subsequence sample is extracted that immediately precedes the failure date and is labeled as failure. For each normal well, all possible subsequences are extracted and labeled as normal. In this case, the number of normal samples is substantially greater than the number of failure samples. An overall error rate of both failure and normal samples can be misleading, so failure sample and normal sample error rates, in addition to the overall error rates, can be reported.

In general, failure prediction is predicting whether or not there is going to be failure in the near future given a set of multivariate time series subsequence $C_p$ for a specific well. Examples of methods that can be employed to evaluate failure prediction accuracy include using k-fold cross-validation and using a test set. Classification algorithms that are used herein include decision tree, Bayesian network, and support vector machine. However, one skilled in the art will appreciate that any classification algorithm that can accommodate the numerical datasets can be used.

An alternating decision tree (ADTree) includes decision nodes and prediction nodes. Decision nodes specify a predicate condition. Prediction nodes contain a single number. ADTrees have prediction nodes as both root and leaves. An instance is classified by an ADTree, following all paths for which all decision nodes are true and summing any prediction nodes that are traversed. In this case, a negative weighted sum indicates potential failure happening in the future. ADTree is unlike the traditional classification decision tree such as C4.5, for which the prediction follows a single path for a final decision. ADTree is used to study the difference between τ sizes, as well as A, B and C ranked attributes, which were mentioned previously herein. From Table 1 below it can be observed that the shorter the subsequence is, the more accurate the cross-validation. Also, it can be seen that it does not make much difference if the low ranked attributes B and C are removed. In other words, the results support the attributes ranking described above.

TABLE 1

ADtree 10-fold cross-validation error rate for different τ values

| | Monthly | | | Biweekly | | | Weekly | | |
|---|---|---|---|---|---|---|---|---|---|
| Error rate | ALL | AB | A | ALL | AB | A | ALL | AB | A |
| Failure | 0.45 | 0.54 | 0.54 | 0.45 | 0.45 | 0.37 | 0.09 | 0.09 | 0.09 |
| Normal | 0.16 | 0.16 | 0.21 | 0.21 | 0.21 | 0.21 | 0.10 | 0.10 | 0.10 |
| Overall | 0.27 | 0.30 | 0.33 | 0.30 | 0.30 | 0.27 | 0.10 | 0.10 | 0.10 |

Support Vector Machine (SVM) is one of the most popular classification methods for machine learning and data mining. A support vector machine constructs a hyperplane or set of hyperplanes in a high or infinite dimensional space, which can be used for classification, regression or other tasks. Intuitively, a good separation is achieved by the hyperplane that has the largest distance to the nearest training datapoints of any class, as know as functional margin, since in general the larger the margin the lower the generalization error of the classifier. For the dataset using a half month subsequence, the SVM performs the best for both failures and overall predictions.

A Bayesian Network was also used on the example dataset. In particular, the simplest Bayesian model—a naïve Bayesian network, was used in which all variables are only dependent on the class variable, and not dependent on each other. Bayesian networks are represented by directed acyclic graphs. The graph nodes represent random variables in the Bayesian sense, i.e. they may be observable quantities, latent variables, unknown parameters or hypotheses. Edges represent conditional dependencies. Nodes that are not connected by edges are conditionally independent of each other. Each node is associated with a probability function that takes as input a particular set of values for the node's parent variables and gives the probability of the variable represented by the node. It provides great potential to unveil the inter-relationships between attributes if further models can be developed. Table 2 shows the 10-fold cross validation results with the three classification algorithms.

TABLE 2

10-fold cross-validation error rates

| Error rate | ADTree | SVM | Bayesian Network |
|---|---|---|---|
| Failure | 0.060 | 0.017 | 0.128 |
| Normal | 0.001 | 0.002 | 0.003 |
| Overall | 0.029 | 0.026 | 0.008 |

There are always various factors that affect the performance of an artificial lift system, e.g., fields, formations, well types, etc. Therefore, even though the training process shows excellent accuracy, it is not always true that the prediction process is also accurate. Moreover, the work of labeling heavily depends on domain expert's efforts. In the example dataset, only a small amount of the samples are labeled. In order to capture the individual knowledge of the testing wells, an approach called random peek is used. Random Peek is inspired by a branch of machine learning domain called semi-supervised learning. In semi-supervised learning only a small amount of samples are labeled, however the data mining algorithm still performs as if all the labels are given. Typically, semi-supervised learning algorithms assume some prior knowledge about the distribution of the data set. In the example case, it is assumed that most of the unlabeled samples should be labeled normal. By splitting the data into two clusters, the bigger cluster is most probable to be the normal subsequences, even though it is not guaranteed that the smaller one represents the failure cases, because not all wells have failures. In fact, most wells are normal. All the random peeks are added into the training set to rebuild the model, which is then used for testing.

Figure 6:
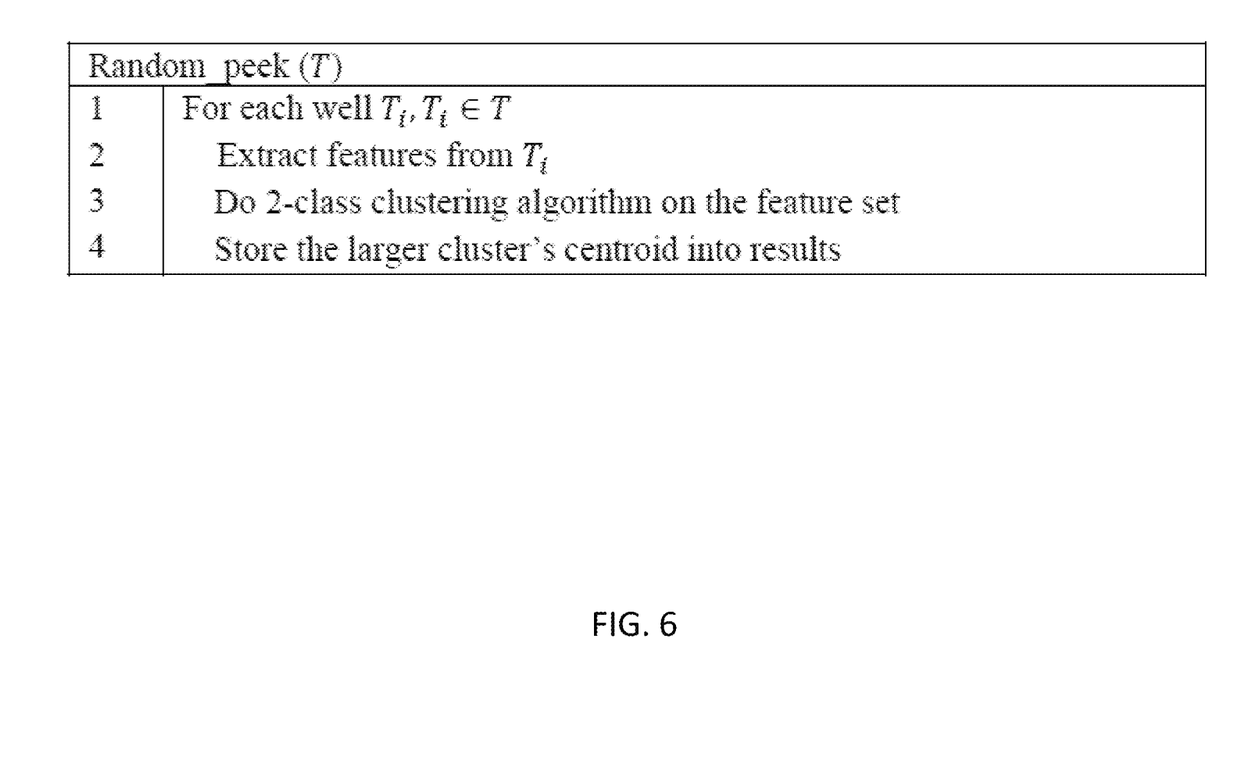
FIG. 6 shows a method for "random peek" semi-supervised learning, according to an embodiment of the present invention.
Figure 7:
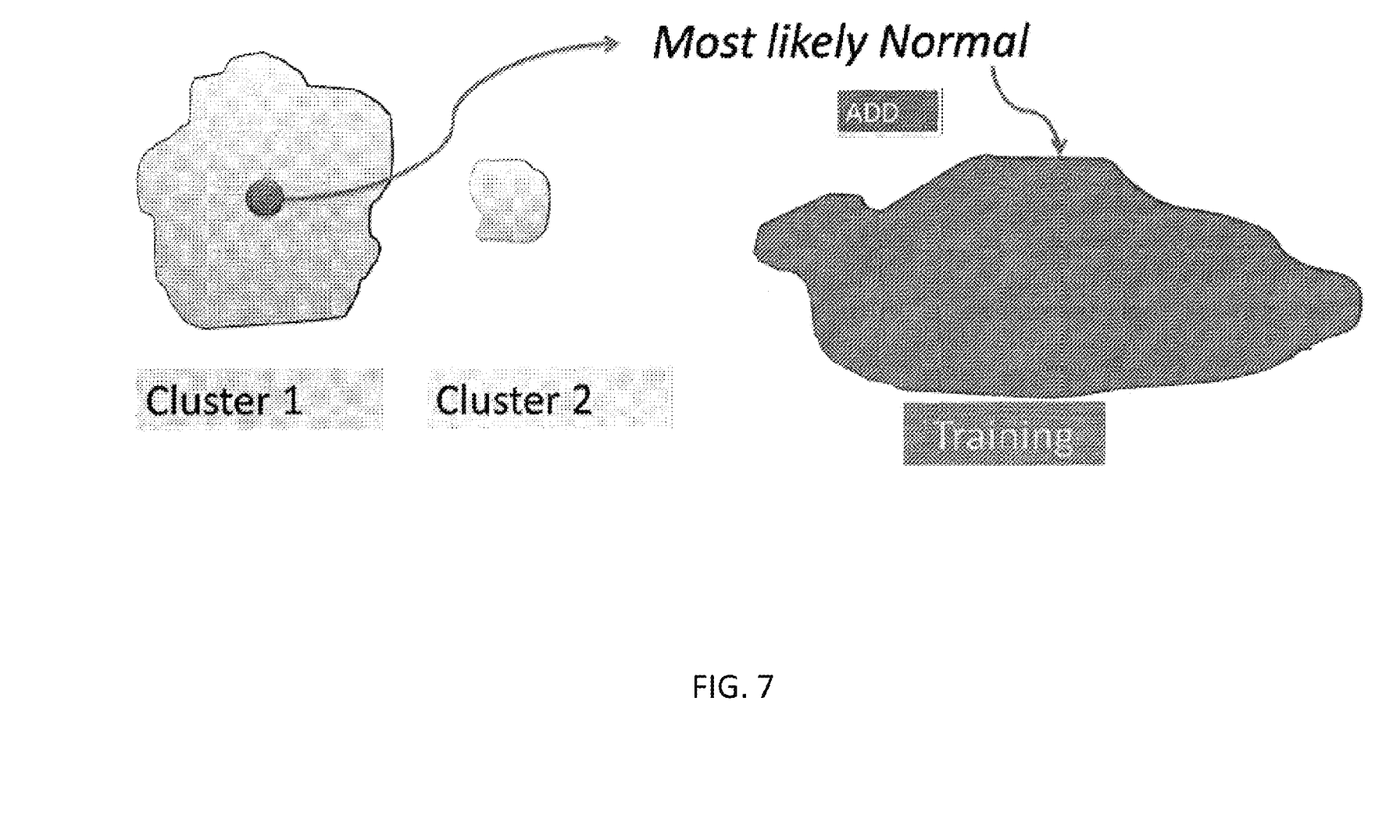
FIG. 7 shows a schematic for "random peek" semi-supervised learning, according to an embodiment of the present invention.

FIG. 6 provides an example of the random peek method. FIG. 7 is a schematic of a random peek method. Together with random peek, the algorithms are used to train on 42 wells, in which 19 have failures, and test on 32 wells from the same field, in which 6 wells have failures. The confusion matrix shown below in table 3, lists all the wells that the algorithm predicted to fail prior of the actual failure in 60 days as correctly predicted. In the table, both the confusion matrix for ADTree and the confusion matrix for using SVM are shown. The numbers along the diagonal are correctly predicted, and the ones off-diagonal are falsely predicted. SVM successfully predicts 5 failures out of 6, but it also predicts 10 out of 27 normal wells to contain failures. ADTree only predicts 1 out of 6 failures, but it has a lower false prediction rate for normal wells, which is 5 out of 27.

TABLE 3

Prediction on 32 wells using ADTree and SVM

| | ADTree | | SVM | |
|---|---|---|---|---|
| | Predicted Failure | Predicted Normal | Predicted Failure | Predicted Normal |
| Failure | 1 | 5 | 5 | 1 |
| Normal | 5 | 22 | 10 | 17 |

During the cross-validation process, two well failures were successfully predicted a month ahead of the actual failure occurrences.

Accordingly, a data mining framework for failure prediction of artificial lift systems is disclosed. The failure prediction problem is formulated as a general classification problem, and a detailed workflow describing the data transformation process that can accommodate a variety of data mining algorithms is provided. As part of this process, statistical correlation analysis, noise handling, and robust polynomial regression is applied and then combined into automatic feature extraction procedures. In addition a random peek semi-supervised learning technique is used to exploit prior knowledge about the data set and the domain. Both K-fold cross-validation and testing confusion matrix results demonstrate the potential of this framework for failure prediction. Such failure prediction can be used to prevent catastrophic failure in wells, lower operational expenses, and reduce downtime.

The above described methods can be implemented in the general context of instructions executed by a computer. Such computer-executable instructions may include programs, routines, objects, components, data structures, and computer software technologies that can be used to perform particular tasks and process abstract data types. Software implementations of the above described methods may be coded in different languages for application in a variety of computing platforms and environments. It will be appreciated that the scope and underlying principles of the above described methods are not limited to any particular computer software technology.

Moreover, those skilled in the art will appreciate that the above described methods may be practiced using any one or a combination of computer processing system configurations, including, but not limited to, single and multi-processer systems, hand-held devices, programmable consumer electronics, mini-computers, or mainframe computers. The above described methods may also be practiced in distributed computing environments where tasks are performed by servers or other processing devices that are linked through a one or more data communications networks. In a distributed computing environment, program modules may be located in both local and remote computer storage media including memory storage devices.

Also, an article of manufacture for use with a computer processor, such as a CD, pre-recorded disk or other equivalent devices, could include a computer program storage medium and program means recorded thereon for directing the computer processor to facilitate the implementation and practice of the above described methods. Such devices and articles of manufacture also fall within the spirit and scope of the present invention.

As will be described, the invention can be implemented in numerous ways, including for example as a method (including a computer-implemented method), a system (including a computer processing system), an apparatus, a computer readable medium, a computer program product, a graphical user interface, a web portal, or a data structure tangibly fixed in a computer readable memory.

Figure 8:
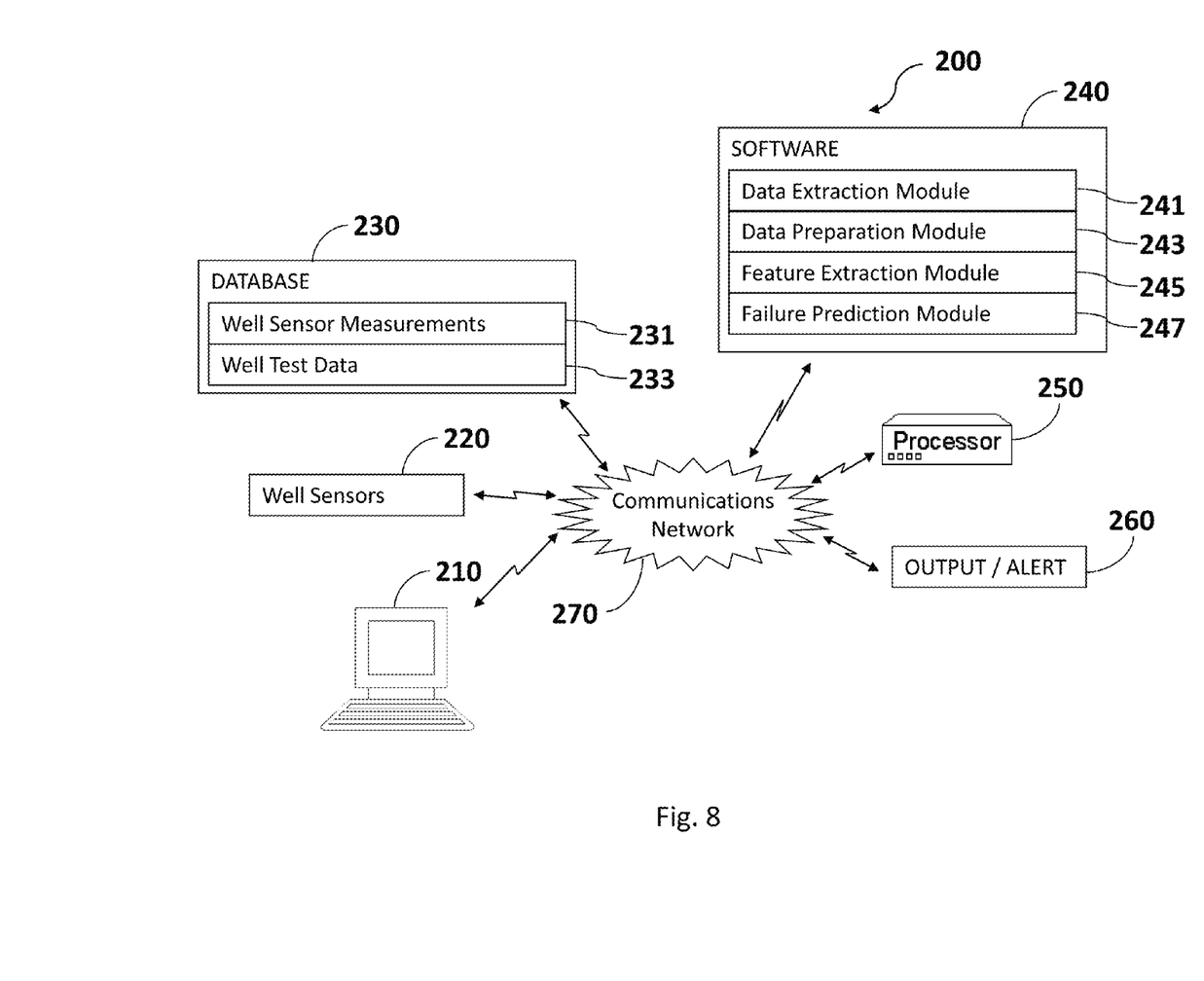
FIG. 8 shows a system for analyzing and predicting the performance on wells, according to an embodiment of the present invention.

FIG. 8 illustrates a system 200 for analyzing and predicting the performance on wells such as on sucker rod pumps, such as by using method 100. System 200 includes user interface 210, such that an operator can actively input information and review operations of system 200. User interface 210 can be any means in which a person is capable of interacting with system 200 such as a keyboard, mouse, or touch-screen display. Operator-entered data input into system 200 through user interface 210, can be stored in database 230. Measured well data such as from POCs, which is received by one or more well sensors 220, can also be input into system 200 for storage in database 230. Additionally, any information generated by system 200 can be stored in database 230.

Database 230 can store, for example, well sensor measurements 231 indicating production and well status through load cells, motor sensors, pressure transducers and relays. Some attributes recorded by well sensors 220 are card area, peak surface load, minimum surface load, strokes per minute, surface stroke length, flow line pressure, pump fillage, yesterday cycles, and daily run time. Furthermore, GB torque, polished rod HP, and net DH pump efficiency can be calculated for storage in database 230. Well test data 233 can also be stored in database 230, which can include last approved oil, last approved water, and fluid level.

System 200 includes a computer program product or software 240 that is stored on a processor readable medium. Current examples of a processor readable medium include, but are not limited to, an electronic circuit, a semiconductor memory device, a ROM, a flash memory, an erasable programmable ROM (EPROM), a floppy diskette, a compact disk (CD-ROM), an optical disk, a hard disk, and a fiber optic medium. As will be described more fully herein, software 240 can include a plurality of modules for performing system tasks such as performing the methods, such as method 100, previously described herein. Processor 250 interprets instructions to execute software 240, as well as, generates automatic instructions to execute software for system 200 responsive to predetermined conditions. Instructions from both user interface 210 and software 240 are processed by processor 250 for operation of system 200. In some embodiments, a plurality of processors can be utilized such that system operations can be executed more rapidly.

Examples of modules for software 240 include, but are not limited to, Data Extraction Module 241, Data Preparation Module 243, Feature Extraction Module 245, and Failure Prediction Module 247. Data Extraction Module 241 is configured to provide software connectors capable of extracting data from database 230 and feeding it to Data Preparation Module 243. Data Preparation Module 243 is configured to apply noise reduction techniques and fault techniques to the extracted data. Feature Extraction Module 245 is configured to transform the de-noised data features and transform all the time series data into a feature set. Failure Prediction Module 247 is configured to apply learning algorithms, such as the random peek semi-supervised learning technique, to train, test and evaluate the results in the data mining stage, thereby providing failure predictions of the wells.

In certain embodiments, system 200 can include reporting unit 260 to provide information to the operator or to other systems (not shown). For example, reporting unit 260 can provide alerts to an operator or technician that a well is predicted to fail. The alert can be utilized to minimize downtime of the well or for other reservoir management decisions. Reporting unit 260 can be a printer, display screen, or a data storage device. However, it should be understood that system 200 need not include reporting unit 260, and alternatively user interface 210 can be utilized for reporting information of system 200 to the operator.

Communication between any components of system 200, such as user interface 210, well sensors 220, database 230, software 240, processor 250 and reporting unit 260, can be transferred over a communications network 270. Communications network 270 can be any means that allows for information transfer. Examples of communications network 270 presently include, but are not limited to, a switch within a computer, a personal area network (PAN), a local area network (LAN), a wide area network (WAN), and a global area network (GAN). Communications network 270 can also include any hardware technology used to connect the individual devices in the network, such as an optical cable or wireless radio frequency.

While in the foregoing specification this invention has been described in relation to certain preferred embodiments thereof, and many details have been set forth for the purpose of illustration, it will be apparent to those skilled in the art that the invention is susceptible to alteration and that certain other details described herein can vary considerably without departing from the basic principles of the invention.

What is claimed is:

1. A computer-implemented method for failure prediction for artificial lift well systems, the method comprising:
    obtaining well data representing a plurality of measured attributes from a plurality of wells over a time period;
    generating features from the well data based on the measured attributes;
    applying a random peek semi-supervised machine learning technique to the features derived from the plurality of wells to generate a failure prediction model, the applying of the random peek semi-supervised machine learning technique including: (a) splitting the well data into at least two data clusters such that a first cluster of well data is larger than a second cluster of well data, wherein the first cluster of well data is assumed to correspond to wells that do not contain one or more well failures and the second cluster of well data is assumed to correspond to wells that contain one or more well failures, and (b) adding well data from the first cluster to a training data set used to generate the failure prediction model;
    determining whether one or more of the plurality of wells is predicted to fail within a subsequent time period based on the failure prediction model; and
    outputting an alert indicative of impending failure of one or more of the plurality of wells.

2. The method of claim 1, wherein the each of the plurality of wells utilizes a sucker rod pump.

3. The method of claim 1, wherein data preparation techniques are applied to the well data prior to generating the features.

4. The method of claim 1, wherein generating the features further comprises generating a multivariate time series.

5. The method of claim 1, wherein generating the features further comprises applying a sliding window approach to extract multiple multivariate subsequences.

6. The method of claim 1, wherein the applying a machine learning technique to the features comprises applying an alternating decision tree method.

7. The method of claim 1, wherein the applying a machine learning technique to the features comprises applying a Bayesian Network method.

8. The method of claim 1, wherein the applying a machine learning technique to the features comprises applying a support vector machine method.

9. The method of claim 1, further comprising:
    adjusting operating parameters of one or more of the plurality of wells to forestall a failure responsive to the alert.

10. The method of claim 1, further comprising:
    scheduling maintenance for one or more of the plurality of wells responsive to the alert.

11. The method of claim 1, further comprising evaluating failure prediction accuracy using K-fold cross-validation method or a test-set method.

12. The method of claim 1, performing a cross-correlation by measuring similarity between two multivariates time sequences of the plurality of measured attributes to determine a dependency between the measured attributes across time.

13. The method of claim 1, further comprising performing a trend analysis and capturing trend information including determining a dependency between the measured attributes across time and determining a dependency between a current value of a measured attribute with a prior value of the measured attribute.

14. The method of claim 13, wherein determining the dependency between the measured attributes across time includes measuring a similarity of two measured attributes as a function of time-lag applied to one of the attributes.

15. The method of claim 13, wherein determining the dependency between the current value of the measured attribute with the prior value of the measured attribute includes applying an auto-correlation method.

16. A system for failure prediction for artificial lift well systems, the system comprising:
    a database configured to store well data representing a plurality of measured attributes from a plurality of wells over a time period;
    a computer processor configured to receive the stored data from the database, and to execute software responsive to the stored data; and
    a software program executable on the computer processor to implement a method, the method comprising:
    extracting features from the well data from the plurality of wells based on the attributes; and
    generating a failure prediction model using a random peek semi-supervised machine learning technique, the random peek semi-supervised machine learning technique including: (a) splitting the well data into at least two data clusters such that a first cluster of well data is larger than a second cluster of well data, wherein the first cluster of well data is assumed to correspond to wells that do not contain one or more well failures and the second cluster of well data is assumed to correspond to wells that contain one or more well failures, and (b) adding well data from the first cluster to a training data set used to generate the failure prediction model; and
    determining whether one or more of the plurality of wells is predicted to fail within a subsequent time period based on the extracted features.

17. The system of claim 16, wherein the system further comprises a display that communicates with the computer processor executing the software program such that an alert indicative of impending production well failures is produced on the display.

18. The system of claim 16, wherein the software program is further executable on the computer processor to extract attributes from the well data in the form of a time series.

19. The system of claim 16, wherein the software program is further executable on the computer processor to reduce noise in the well data.

20. The system of claim 16, wherein the software program is further executable on the computer processor to generate a multivariate time series.

21. The system of claim 16, wherein the software program is further executable on the computer processor to apply a sliding window approach to extract multiple multivariate subsequences.

22. A computer program product, comprising a non-transitory computer usable medium having a computer readable program code embodied therein, the computer readable program code configured to be executed on a computer system to implement a method for failure prediction for artificial lift well systems, the method comprising:

extracting features from well data representing a plurality of measured attributes from a plurality of wells over a time period; and     applying a random peek semi-supervised machine learning technique to the features to create a failure prediction model based on the features from the plurality of wells, the random peek semi-supervised machine learning technique including: (a) splitting the well data into at least two data clusters such that a first cluster of well data is larger than a second cluster of well data, wherein the first cluster of well data is assumed to correspond to wells that do not contain one or more well failures and the second cluster of well data is assumed to correspond to wells that contain one or more well failures, and (b) adding well data from the first cluster to a training data set used to generate the failure prediction model; and determining whether one or more of the plurality of wells is predicted to fail within a given time period based on the failure prediction model.

\* \* \* \* \*